(12) United States Patent
Knight et al.

(10) Patent No.: US 7,177,792 B2
(45) Date of Patent: Feb. 13, 2007

(54) INTEGER PROGRAMMING DECODER FOR MACHINE TRANSLATION

(75) Inventors: Kevin Knight, Hermosa Beach, CA (US); Kenji Yamada, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 873 days.

(21) Appl. No.: 10/160,284

(22) Filed: May 31, 2002

(65) Prior Publication Data

US 2002/0188438 A1    Dec. 12, 2002

Related U.S. Application Data

(60) Provisional application No. 60/295,182, filed on May 31, 2001.

(51) Int. Cl.
    *G10L 21/00*    (2006.01)
(52) U.S. Cl. .......................................................... 704/2
(58) Field of Classification Search .................... 704/2, 704/8, 9
    See application file for complete search history.

(56) References Cited

U.S. PATENT DOCUMENTS 5,267,156 A * 11/1993 Nomiyama ................... 704/10
5,477,451 A    12/1995 Brown et al.
5,867,811 A     2/1999 O'Donoghue
5,987,404 A    11/1999 Della Pietra et al.
6,031,984 A     2/2000 Walser
6,064,819 A *   5/2000 Franssen et al. ............. 717/156
6,182,014 B1    1/2001 Kenyon et al.
6,393,388 B1 *  5/2002 Franz et al. .................... 704/4
2002/0188438 A1* 12/2002 Knight et al. ................... 704/2

OTHER PUBLICATIONS

Kumar et al., "Integer Programming Approach to Printed Circuit Board Assembly Time Optimization," Nov. 1995, IEEE Transactions on Components, Packaging, and Manufacturing Technology-Part B, vol. 18, No. 4, pp. 720-727.*

Richard et al., "Visiting the Traveling Salesman Problem with Petri nets and application in the glass industry," Feb. 1996, IEEE Emerging Technologies and Factory Automation, pp. 238-242.*

* cited by examiner

*Primary Examiner*—Susan McFadden
(74) *Attorney, Agent, or Firm*—Carr & Ferrell LLP

(57) ABSTRACT

A machine translation (MT) decoder may transform a translation problem into an integer programming problem, such as a Traveling Salesman Problem (TSP). The decoder may invoke an integer program (IP) solver to solve the integer programming problem and output a likely decoding based on the solution.

18 Claims, 4 Drawing Sheets

INTEGER PROGRAMMING DECODER FOR MACHINE TRANSLATION

CROSS-REFERENCE TO RELATED APPLICATIONS

This application claims priority to U.S. Provisional Patent Application Ser. No. 60/295,182, filed on May 31, 2001.

ORIGIN OF INVENTION

The research and development described in this application were supported by DARPA-ITO under grant number N66001-00-1-9814. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

One type of MT decoder is the statistical MT decoder. A statistical MT decoder that translates French sentences into English may include a language model (LM) that assigns a probability P(e) to any English string, a translation model (TM) that assigns a probability P(f|e) to any pair of English and French strings, and a decoder. The decoder may take a previously unseen sentence f and try to find the e that maximizes P(e|f), or equivalently maximizes P(e)·P(f|e).

A "stack decoder" is a type of statistical MT decoder. In a stack decoder, possible translations are organized into a graph structure and then searched until an optimal solution (translation) is found. Although stack decoders tend to produce good results, they do so at a significant cost. Maintaining and searching a large potential solution space is expensive, both computationally and in terms of computer memory.

SUMMARY

A machine translation (MT) decoder may transform a translation problem into an integer programming problem, such as a Traveling Salesman Problem (TSP). The decoder may include a graph generator which generates a graph including a number of regions, or cities, corresponding to words in an input source language sentence or phrase. Each region may include a number of nodes, or hotels, corresponding to possible translations of the source language word corresponding to that region. The graph generator may use linguistic constraint information in a translation database to assign distances between hotels.

The decoder may invoke an integer program (IP) solver to find a shortest tour on the graph, i.e., solve the TSP. The decoder may output a likely decoding which includes the words corresponding to the hotels visited aligned in the order the hotels were visited in the tour.

DETAILED DESCRIPTION

Figure 1:
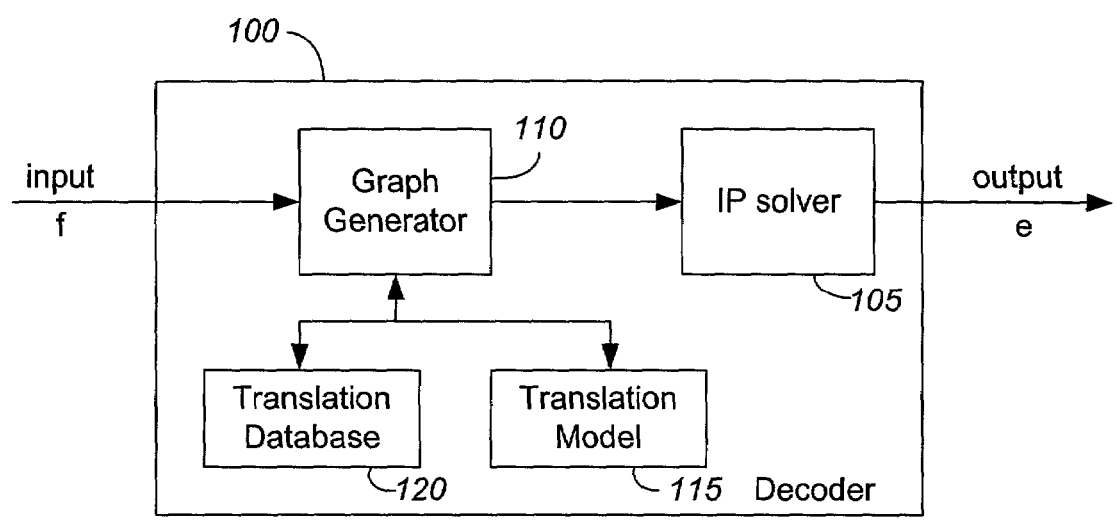
FIG. 1 is a block diagram of a machine translation decoder.

FIG. 1 illustrates a machine translation (MT) decoder 100 which utilizes a linear integer programming model to translate sentences in a source language (e.g., French) into a target language (e.g., English). The decoder 100 may transform a decoding problem into a linear integer programming problem.

A solution to an integer programming problem involves an assignment of variables. Solutions are constrained by inequalities involving linear combinations of variables. An optimal solution is one that respects the constraints and minimizes the value of the objective function, which is also a linear combination of variables.

One type of linear integer programming problem is the Traveling Salesman Problem (TSP). The hypothetical situation posed by the TSP concerns a salesman who spends his time visiting a number of cities (or nodes) cyclically. In one tour the salesman visits each city just once, and finishes up where he started. The Traveling Salesman Problem is this: given a finite number of "cities" along with the cost of travel between each pair of them (e.g., distance), find the cheapest (e.g., shortest) way of visiting all the cities and returning to the starting point.

Much effort has been dedicated to the TSP, and powerful tools have been developed to solve TSP and other integer programming problems. For example, the Center for Research on Parallel Computation (CRPC), a National Science Foundation Science and Technology Center established in 1989, has solved the TSP for 13,509 U.S. cities with populations of more than 500 people. Such an integer program (IP) solver may be utilized by the decoder 100 to solve a translation problem posed as a TSP.

Figure 2:
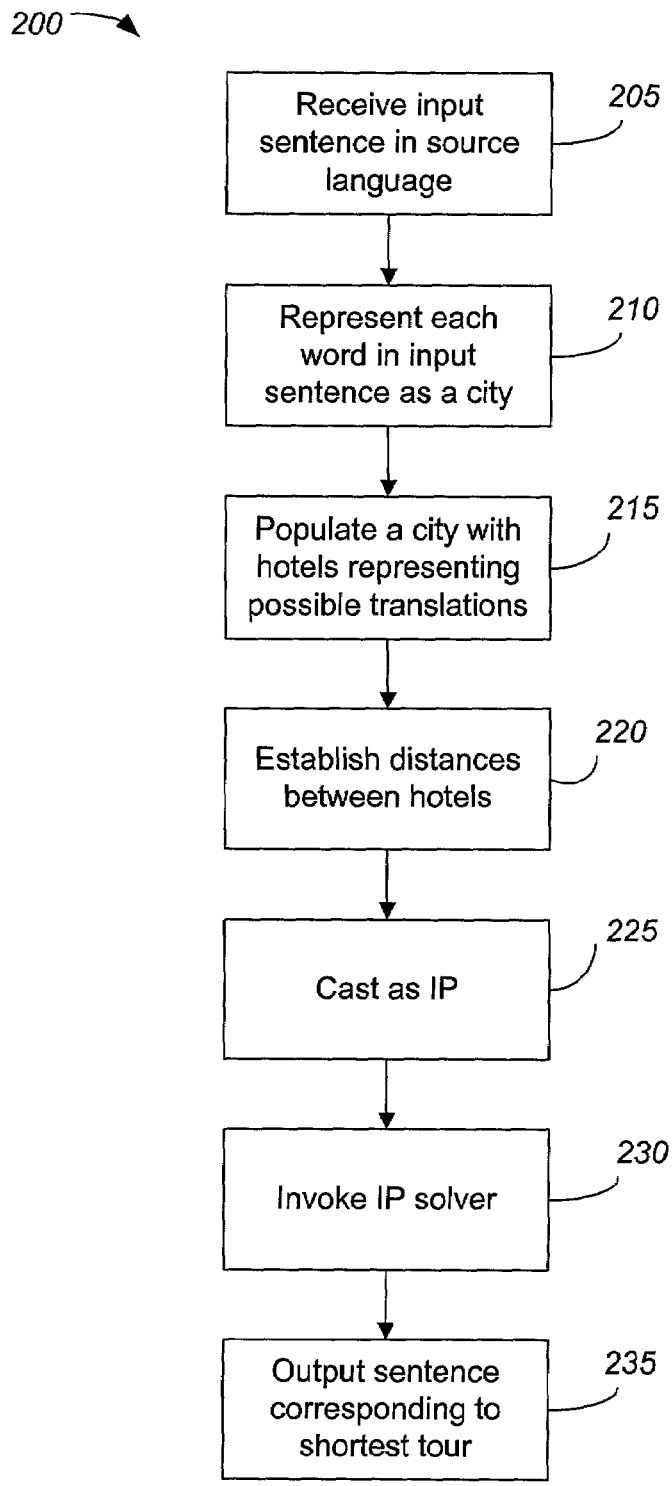
FIG. 2 is a flowchart describing an integer programming decode operation 200.

The decoder may transform a decoding problem into a TSP format and then use an IP solver 105 to generate a translation. FIG. 2 is a flowchart describing a decoding operation 200 according to an embodiment.

Figure 3:
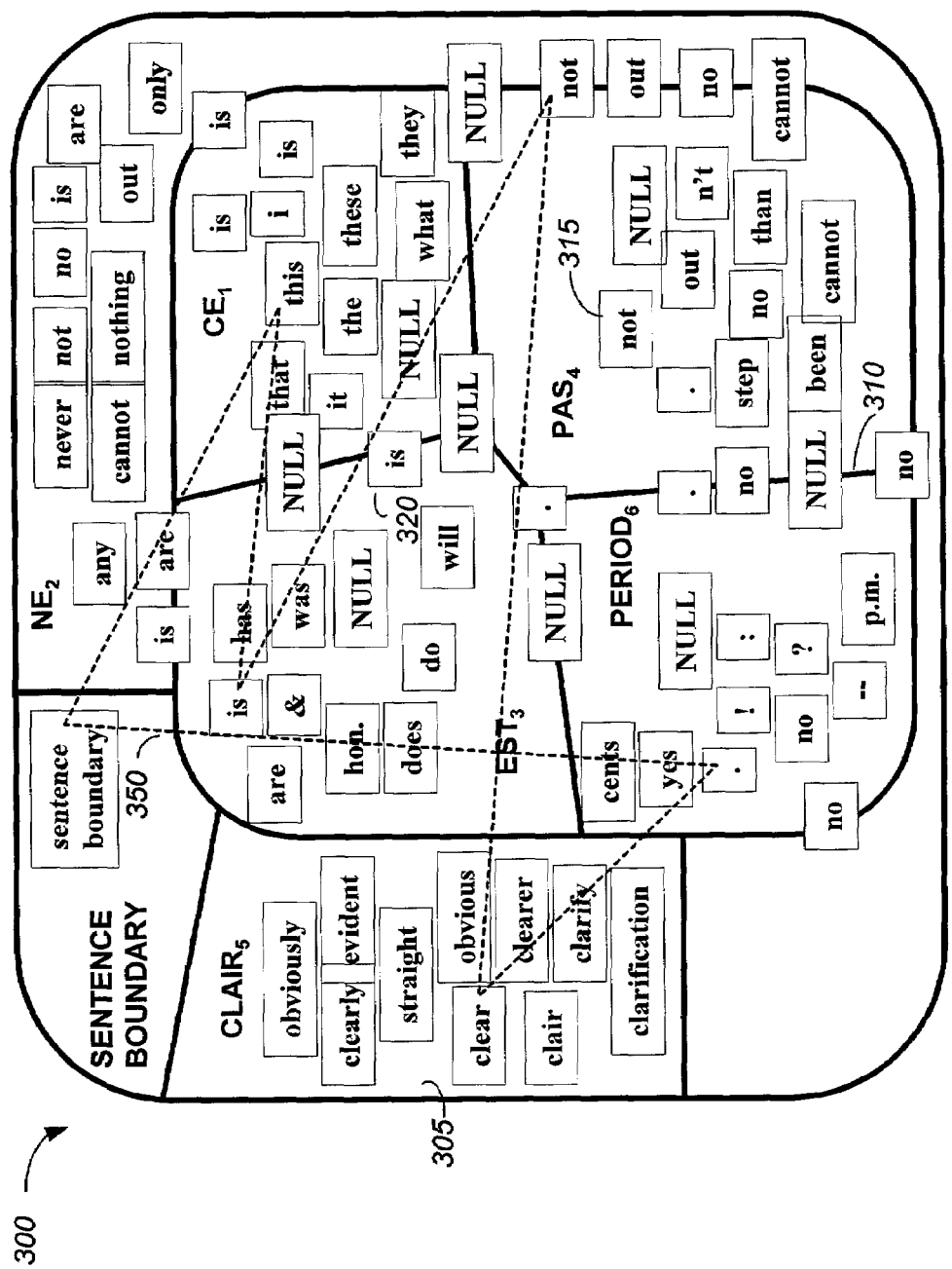
FIG. 3 is a salesman graph for a translation problem.

A graph generator 110 may express an MT decoding problem in a TCP format by constructing a salesman graph. FIG. 3 is a salesman graph 300 for the input sentence f="CE NE EST PAS CLAIR." (block 205). Each word in the observed sentence f may be represented as a city 305. City boundaries 310 are shown with bold lines. Each city may be populated with a number of hotels 315 corresponding to likely English word translations (block 210). The owner of a hotel is the English word inside the rectangle. If two cities have hotels with the same owner x, then a third hotel 320 owned by x (e.g., the English word "is") may be built on the border of the two cities (in this case, the cities "CE" and "EST"). More generally, if n cities all have hotels owned by x, $2^n-n-1$ new hotels may be build, one for each non-empty, non-singleton subset of the cities, on various city borders and intersections. An extra city representing the sentence boundary may also be added to the salesman graph and serve as the starting point for the tour.

A tour of cities may be defined as a sequence of hotels (starting at the sentence boundary hotel) that visits each city exactly once before returning to the starting point. If a hotel sits on the border between two cities, then staying at that hotel counts as visiting both cities. Each tour of cities corresponds to a potential decoding <e,a>, where "e" represents the words in the English string and "a" represents the alignment of the words. The owners of the hotels on the tour yield e, while the hotel locations yield a.

The distances between hotels may represent various constraints of an integer program. Real-valued (asymmetric) distances may be established between pairs of hotels such that the length of any tour is exactly the negative of $\log(P(e) \cdot P(a,f|e))$ (block 215). For example, because the logarithm function is monotonic, the shortest tour may correspond to the likeliest decoding.

Figure 4:
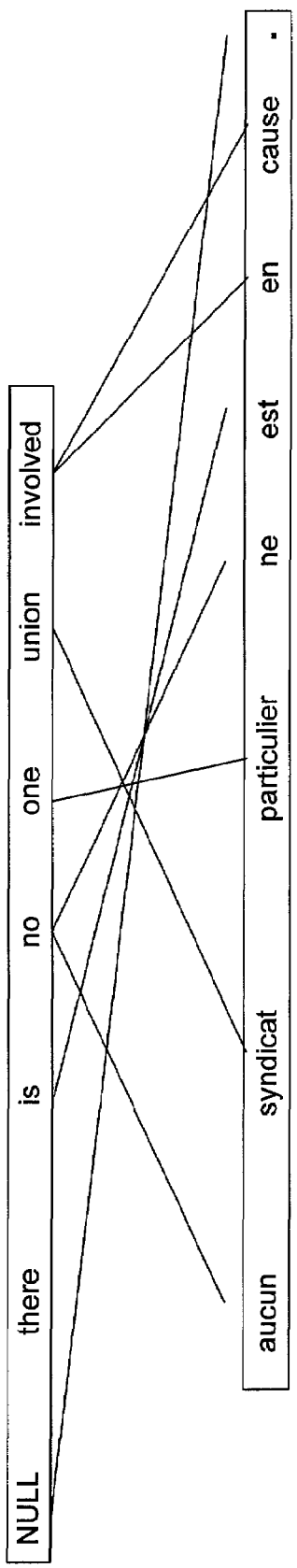
FIG. 4 illustrates the results of a word alignment operation.

The distance assigned to each pair of hotels may be based on a translation model 115, e.g., the IBM Model 4 formula, described in U.S. Pat. No. 5,477,451. The IBM Model 4 revolves around the notion of a word alignment over a pair of sentences, such as that shown in FIG. 4. A word alignment assigns a single home (English string position) to each French word. If two French words align to the same English word, then that English word is said to have a fertility of two. Likewise, if an English word remains unaligned-to, then it has fertility zero. Because the destination hotel "not" sits on the border between cities NE and PAS, it corresponds to a partial alignment in which the word "not" has fertility two:

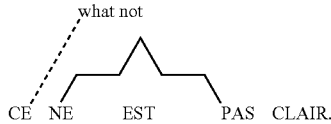

Assuming that the price has already been paid for visiting the "what" hotel, then the inter-hotel distance need only account for the partial alignment concerning "not":

distance =
- $-\log(\text{bigram}(\text{not}|\text{what}))$//chance of "not" given the previous word was "what"
- $-\log(n(2|\text{not}))$//chance that word "not" in English generates two French words
- $-\log(t(\text{NE}|\text{not})) - \log(t(\text{PAS}|\text{not}))$//chance that "not" would translate to "ne" and "pas".
- $-\log(d_1(+1|\text{class}(\text{what}),\text{class}(\text{NE})))$
- $-\log(d_{>1}(+2|\text{class}(\text{PAS})))$//given that "what" translates to the first French word, what is the chance that "not" will translate to the second French word.

These and constraints for different words may be stored in a translation database 120.

An infinite distance may be assigned in both directions between hotels that are located (even partially) in the same city because travel from one to the other can never be part of a tour.

NULL-owned hotels may be treated specially. All non-NULL hotels must be visited before any NULL hotels and at most one NULL hotel may be visited on a tour. Since only one NULL hotel is allowed to be visited, the fertility of the NULL word is simply the number of cities that hotel straddles, and the length of f is the number of cities minus one.

The tour selection may be cast as an integer programming problem (block 225). A binary (0/1) integer variable $x_{ij}$ may be created for each pair of hotels i and j. The value $x_{ij}$ equals 1 if and only if travel from hotel i to hotel j is on the itinerary. The objective function is then:

$$\text{minimize:} \sum_{(i,j)} x_{ij} \cdot \text{distance}(i, j)$$

This minimization may be subject to three classes of constraints. First, every city must be visited exactly once. That means exactly one tour segment must exit each city:

$$\forall_{c \in \text{cities}} : \sum_{i \text{ located at least partially in } c} \sum_{j} x_{ij} = 1$$

Second, the segments must be linked to one another, i.e., every hotel has either (a) one tour segment coming in and one going out, or (b) no segments in and none out. To put it another way, every hotel must have an equal number of tour segments going in and out:

$$\forall_i : \sum_j x_{ij} = \sum_j x_{ji}$$

Third, to prevent multiple independent sub-tours, require that every proper subset of cities have at least one tour segment leaving it:

$$\forall_{s \subset \text{cities}} : \sum_{i \text{ located entirely within } s} \sum_{j \text{ located at least partially outside } s} x_{ij} >= 1$$

There may be an exponential number of constraints in this third class.

Once cast as an integer program, the IP solver may be invoked. Exemplary IP solvers include lp_solve, available free of charge at ftp://ftp.ics.ele.tue.nl/pub/lp_solve, and CPLEX, available from ILOG, Inc. of Mountain View, Calif.

Mnemonic names may be assigned to the variables, and <e,a> extracted from the list of variables and their binary values. The sentence corresponding to the shortest tour may then be output (block 235). For example, the shortest tour 350 for the graph 300 in FIG. 3 corresponds to the optimal decoding: "it is not clear." A second-best decoding can be obtained by adding a new constraint to the integer programming problem to stop the IP solver 105 from choosing the same solution again.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
   transforming a translation problem into an integer programming problem; and
   generating a translation text in response to solving the integer programming problem, wherein said transforming comprises generating a graph comprising a plurality of regions, each region including one or more nodes, wherein said generating a translation text comprises generating a text segment in a target language corresponding to a translation of a text segment in a source language.

2. The method of claim 1, further comprising:
inputting a text segment including words in a source language,
wherein each of said plurality of regions represents a corresponding one of the words in the source language, and
wherein the one or more nodes in each of said plurality of regions represent possible translations of the word corresponding to said region.

3. The method of claim 2, further comprising:
assigning a distance between each of said nodes, said distance comprising one or more linguistic constraints.

4. The method of claim 3, wherein said generating a translation comprises finding a shortest tour including one node in each of said plurality of regions.

5. The method of claim 4, wherein said graph further comprises a region corresponding to a sentence boundary.

6. The method of claim 5, wherein said tour begins and ends in the region corresponding to the sentence boundary.

7. The method of claim 2, wherein said transforming comprises transforming the translation problem into a traveling salesman problem.

8. Apparatus comprising:
a transformation module operative to transform an input text segment in a source language into an integer programming problem ; and
an integer program solver operative to solve said integer programming problem, and a database including a plurality of linguistic constraints for a target language and a plurality of words in the target language corresponding to possible translations a plurality of words in a source language, wherein the transformation module comprises a graph generator operative to generate a graph including a plurality regions and a plurality of nodes, each region corresponding to a word in an input source language text segment and each node corresponding to a possible translation of a word in the input source language, and to assign a distance between nodes based on said plurality of linguistic constraints.

9. The apparatus of claim 8, wherein the integer program solver is operative to find a shortest tour including one node in each of said plurality of regions.

10. The apparatus of claim 8, wherein the integer problem solver is further operative to output a text segment in the target language, said text segment including a plurality of words corresponding to the nodes in the shortest tour.

11. The apparatus of claim 8, wherein the plurality of words are aligned in an order corresponding to an order of nodes visited in the tour.

12. An article comprising a machine-readable medium including machine-executable instructions, the instruction operative to cause the machine to:
transform a translation problem into an integer programming problem; and
generate a translation text in response to solving the integer programming problem, wherein the instructions operative to cause the machine to generate a translation text include instructions operative to cause the machine to generate a text segment in a target language corresponding to a translation of a text segment in a source language, wherein the instructions operative to cause the machine to transform include instructions operative to cause the machine to generate a graph comprising a plurality of regions, each region including one or more nodes.

13. The article of claim 12, further comprising instructions operative to cause the machine to:
input a text segment including words in a source language,
wherein each of said plurality of regions represents a corresponding one of the words in the source language, and
wherein the one or more nodes in each of said plurality of regions represent possible translations of the word corresponding to said region.

14. The article of claim 12, further comprising instructions operative to cause the machine to:
assign a distance between each of said nodes, said distance comprising one or more linguistic constraints.

15. The article of claim 12, wherein the instructions operative to cause the machine to generate a translation includes instructions operative to cause the machine to find a shortest tour including one node in each of said plurality of regions.

16. The article of claim 12, wherein said graph further comprises a region corresponding to a sentence boundary.

17. The article of claim 12, wherein said tour begins and ends in the region corresponding to the sentence boundary.

18. The article of claim 12, wherein the instructions operative to cause the machine to transform instructions operative to cause the machine to transform the translation problem into a traveling salesman problem.

* * * * *